United States Patent
Chandramouli et al.

(10) Patent No.: US 10,028,082 B2
(45) Date of Patent: Jul. 17, 2018

(54) METHOD TO TRIGGER DEVICES BASED ON THEIR LOCATION

(75) Inventors: Devaki Chandramouli, Plano, TX (US); Rainer Liebhart, Munich (DE)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 0 days.

(21) Appl. No.: 14/396,145

(22) PCT Filed: Apr. 23, 2012

(86) PCT No.: PCT/US2012/034636
§ 371 (c)(1),
(2), (4) Date: Oct. 22, 2014

(87) PCT Pub. No.: WO2013/162494
PCT Pub. Date: Oct. 31, 2013

(65) Prior Publication Data
US 2015/0119083 A1    Apr. 30, 2015

(51) Int. Cl.
*H04W 4/02* (2018.01)
*H04W 4/70* (2018.01)
(Continued)

(52) U.S. Cl.
CPC ............. *H04W 4/02* (2013.01); *H04W 4/005* (2013.01); *H04W 4/70* (2018.02); *H04W 60/04* (2013.01)

(58) Field of Classification Search
CPC ......... H04W 4/02; H04W 4/70; H04W 4/005; H04W 4/08; H04W 4/06; H04W 60/04; H04W 4/021
(Continued)

(56) References Cited

U.S. PATENT DOCUMENTS 7,502,626 B1   3/2009   Lemilainen
8,125,892 B1   2/2012   Jokimies et al.
(Continued)

OTHER PUBLICATIONS

International Search Report and Written Opinion dated Sep. 24, 2012 corresponding to International Patent Application No. PCT/US2012/034636.
(Continued)

*Primary Examiner* — Kabir A Timory
(74) *Attorney, Agent, or Firm* — Squire Patton Boggs (US) LLP

(57) ABSTRACT

Communication systems including the evolved packet system can include machine type communication. Location device triggering can be a feature related to machine type communication (MTC) and can also be applied to other areas, such as public safety networks. In this feature, the network can initiate a trigger to the device, such as MTC devices, based on area information provided to the network operator. A method can include triggering a group of devices using a triggering request. The triggering request includes at least one of geographic information or a group identifier based on geographic information. The method can also include receiving the request and determining at least one serving node based on the geographic information when the triggering request geographic information. The method can further include sending a device trigger request including at least one of a tracking area identifier, a cell identifier, or the group identifier.

27 Claims, 6 Drawing Sheets

(51) Int. Cl.
*H04W 60/04* (2009.01)
*H04W 4/00* (2018.01)
(58) Field of Classification Search
USPC .......................................................... 455/456
See application file for complete search history.

(56) References Cited

U.S. PATENT DOCUMENTS

| | | |
|---|---|---|
| 2006/0030333 A1 | 2/2006 | Ward et al. |
| 2006/0271551 A1 | 11/2006 | Suojasto |
| 2009/0232022 A1 | 9/2009 | Savolainen et al. |
| 2011/0119547 A1 | 5/2011 | Kim et al. |
| 2013/0265953 A1* | 10/2013 | Salkintzis et al. ............ 370/329 |

OTHER PUBLICATIONS

3GPP TS 23.682 V11.0.0 (Mar. 2012), Technical Specification, 3rd Generation Partnership Project; Technical Specification Group Services and System Aspects; Architecture Enhancements to Facilitate Communications with Packet Data Networks and Applications (Release 11), Mar. 2012, 24 pages.
3GPP TS 23.401 V11.1.0 (Mar. 2012), Technical Specification, 3rd Generation Partnership Project; Technical Specification Group Services and System Aspects; General Packet Radio Service (GPRS) Enhancements for Evolved Universal Terrestrial Radio Access Network (E-UTRAN) Access (Release 11), Mar. 2012, 284 pages.
3GPP TS 23.888 V1.6.1 (Feb. 2012), Technical Specification, 3rd Generation Partnership Project; Technical Specification Group Services and System Aspects; System Improvements for Machine-Type Communications (Release 11), Feb. 2012, 165 pages.
3GPP TS 22.368 V11.4.0 (Mar. 2012), Technical Specification, 3rd Generation Partnership Project; Technical Specification Group Services and System Aspects; Service Requirements for Machine-Type Communications (MTC) Stage 1 (Release 11), Mar. 2012, 25 pages.
European Search Report dated Nov. 12, 2015 for corresponding EP Patent Appln. No. 12875529.5.
S2-110446; Huawei; "Solution for group triggering of attached MTC devices"; 3GPP TSG SA WG2 Meeting #83; Feb. 21-26, 2011, Salt Lake City, Utah, USA, 3 pages.
3GPP TS 22368 V113.0 (Sep. 2011); 3rd Generation Partnership Project; Technical Specification Group Services and System Aspects; Service requirements for Machine-Type Communications (MTC); Stage 1 (Release 11), 24 pages.

* cited by examiner

METHOD TO TRIGGER DEVICES BASED ON THEIR LOCATION

BACKGROUND

Field

Communication systems including the evolved packet system can include machine type communication. Location device triggering can be a feature related to machine type communication (MTC) and can also be applied to other areas, such as public safety networks. In this feature, the network can initiate a trigger to the device, such as MTC devices, based on area information provided to the network operator.

Description of the Related Art

The evolved packet system (EPS), the successor of general packet radio system (GPRS), provides radio interfaces and packet core network functions for broadband wireless data access. EPS core network functions include the mobility management entity (MME), the packet data network gateway (PDN-GW) and the Serving Gateway (S-GW). An example of an evolved packet core architecture is illustrated in FIG. 1 and is described by third generation partnership project (3GPP) technical specification (TS) 23.401, which is incorporated herein by reference in its entirety. A common packet domain core network can be used for both radio access networks (RANs), the global system for mobile communication (GSM) enhanced data rates for GSM evolution (EDGE) radio access network (GERAN) and the universal terrestrial radio access network (UTRAN).

For machine-type-communication (MTC) a functional entity called MTC interworking function (MTC-IWF) and several new interfaces, including S6m, Tsp, Tsms, T5a/b/c and T4, have been introduced to the 3GPP architecture. FIG. 2 illustrates machine-type-communication additions to the 3GPP architecture, as well as the various interfaces identified. The MTC-IWF and the new interfaces in 3GPP Release 11 (Rel 11) can, for example, enable triggering of devices with or without a mobile subscriber integrated services digital network number (MSISDN) from an internal or external MTC server. The triggering of the devices may be, for example, in order to establish a packet data network (PDN) connection and/or packet data protocol (PDP) context. A 3GPP architecture for machine-type communication is discussed in 3GPP TS 23.682, which incorporated herein by reference in its entirety.

Cell broadcasting service is one technique that may be used to trigger non-attached MTC devices based on location information provided by an MTC user.

SUMMARY

According to certain embodiments, a method includes triggering a group of devices using a triggering request. The triggering request includes at least one of geographic information or a group identifier based on geographic information.

In certain embodiments, a method includes receiving a request to trigger a group of devices, wherein the triggering request comprises at least one of geographic information or a group identifier based on geographic information. The method also includes determining at least one serving node based on the geographic information when the triggering request geographic information. The method further includes sending a device trigger request including at least one of a tracking area identifier, a cell identifier, or the group identifier.

An apparatus, in certain embodiments, includes at least on processor and at least one memory including computer program code. The at least one memory and the computer program code are configured to, with the at least one processor, cause the apparatus at least to trigger a group of devices using a triggering request. The triggering request includes at least one of geographic information or a group identifier based on geographic information.

An apparatus, according to certain embodiments, includes at least on processor and at least one memory including computer program code. The at least one memory and the computer program code are configured to, with the at least one processor, cause the apparatus at least to receive a request to trigger a group of devices, wherein the triggering request includes at least one of geographic information or a group identifier based on geographic information. The at least one memory and the computer program code are also configured to, with the at least one processor, cause the apparatus at least to determine at least one serving node based on the geographic (geo) location coordinates or cell ID or tracking area identifier when the triggering request includes geographic (geo) location coordinates. The at least one memory and the computer program code are further configured to, with the at least one processor, cause the apparatus at least to send a device trigger request including at least one of a tracking area identifier, a cell identifier, or the group identifier.

According to certain embodiments, an apparatus includes triggering means for triggering a group of devices using a triggering request. The apparatus also includes receiving means for receiving a response to the triggering request. The triggering request includes at least one of geographic information or a group identifier based on geographic information.

In certain embodiments, an apparatus includes receiving means for receiving a request to trigger a group of devices. The triggering request includes at least one of geographic information or a group identifier based on geographic information. The apparatus also includes determining means for determining at least one serving node based on the geographic information when the triggering request geographic information. The apparatus further includes sending means for sending a device trigger request including at least one of a tracking area identifier, a cell identifier, or the group identifier.

A non-transitory computer readable medium in certain embodiments is encoded with instructions that, when executed in hardware, perform a process. The process includes triggering a group of devices using a triggering request. The triggering request includes at least one of geographic information or a group identifier based on geographic information.

A non-transitory computer readable medium according to certain embodiments is encoded with instructions that, when executed in hardware, perform a process. The process includes receiving a request to trigger a group of devices, wherein the triggering request comprises at least one of geographic information or a group identifier based on geographic information. The process also includes determining at least one serving node based on the geographic information when the triggering request geographic information. The process further includes sending a device trigger request including at least one of a tracking area identifier, a cell identifier, or the group identifier.

According to certain embodiments, a method includes receiving a device trigger request for a group of devices. The method also includes delivering the trigger to at least one device of the group.

An apparatus, in certain embodiments, includes at least one processor and at least one memory including computer program code. The at least one memory and the computer program code are configured to, with the at least one processor, cause the apparatus at least to receive a device trigger request for a group of devices. The at least one memory and the computer program code are also configured to, with the at least one processor, cause the apparatus at least to deliver the trigger to at least one device of the group.

An apparatus, in certain embodiments, includes receiving means for receiving a device trigger request for a group of devices. The apparatus also includes delivering means for delivering the trigger to at least one device of the group.

A non-transitory computer readable medium, according to certain embodiments, is encoded with computer program instructions that, when executed in hardware, perform a process. The process includes receiving a device trigger request for a group of devices. The process also includes delivering the trigger to at least one device of the group.

BRIEF DESCRIPTION OF THE DRAWINGS

For proper understanding of the invention, reference should be made to the accompanying drawings, wherein.

DETAILED DESCRIPTION

Location device triggering can be a feature related to machine type communication (MTC). In this feature, the network can initiate a trigger to the MTC devices based on area information provided to the network operator. Moreover, the network can apply a location specific trigger when mobility management frequency is reduced on the MTC device. Furthermore, the network can apply the location specific trigger even when the MTC device is not attached to the network. The area covered can be based on the characteristics of the radio access network, for example, a cell or a group of cells.

Certain embodiments provide a location based triggering feature. There may be at least two options to trigger the users or devices, in general any type of user equipment, in a certain location.

Figure 1:
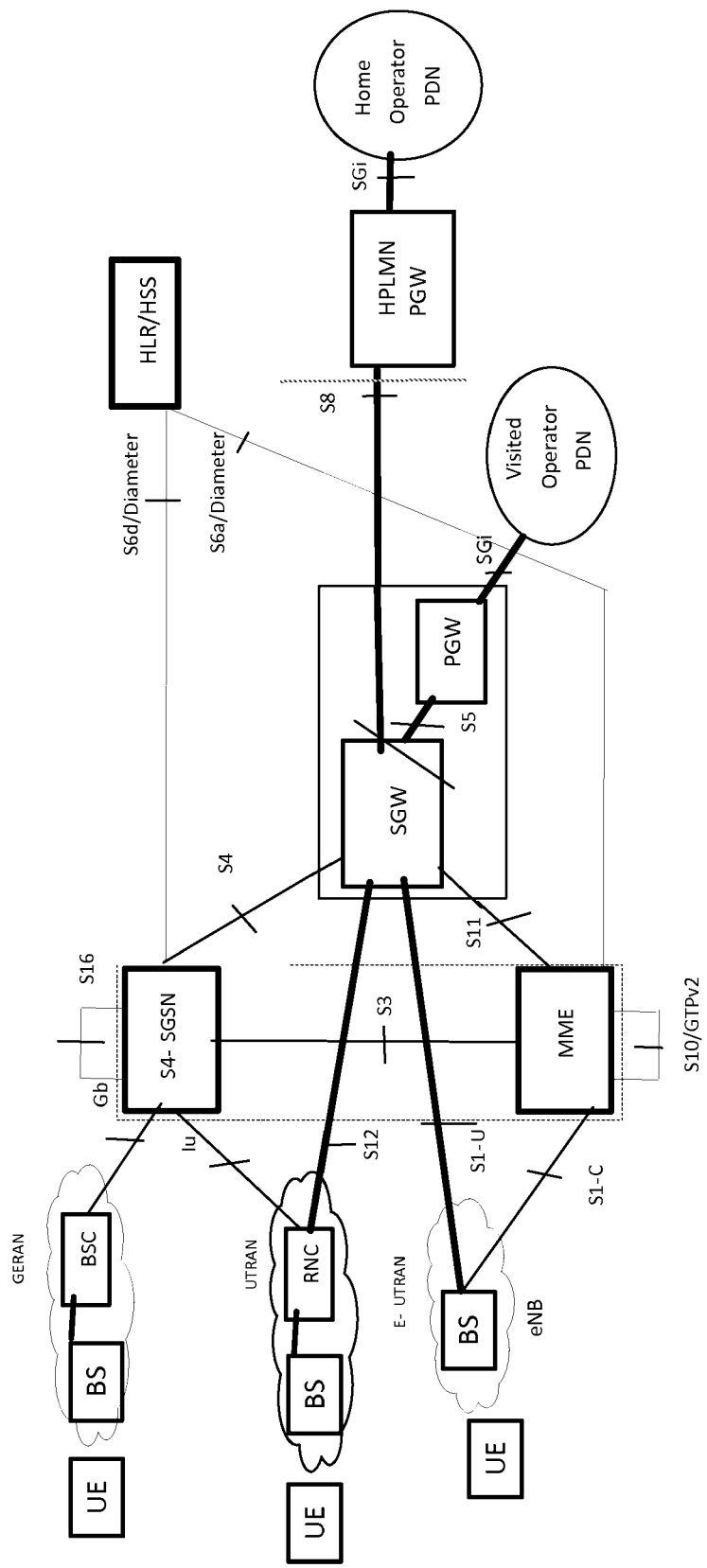
FIG. 1 illustrates an evolved packet core architecture.
Figure 2:
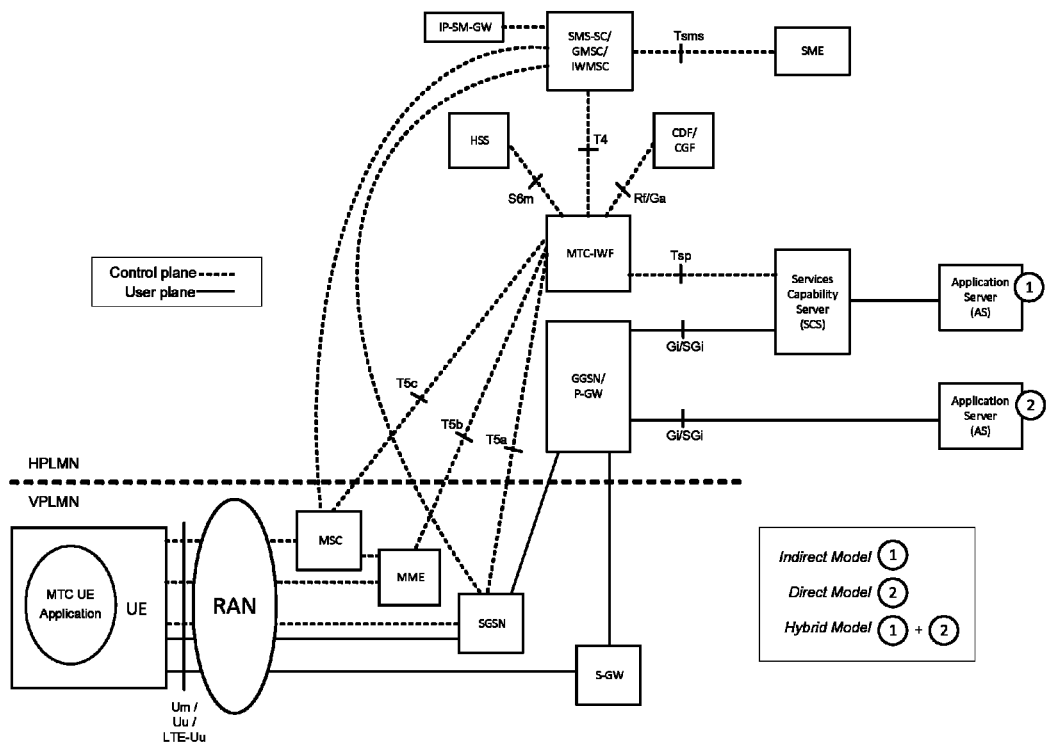
FIG. 2 illustrates machine-type-communication additions to a third generation partnership project architecture.
Figure 3:
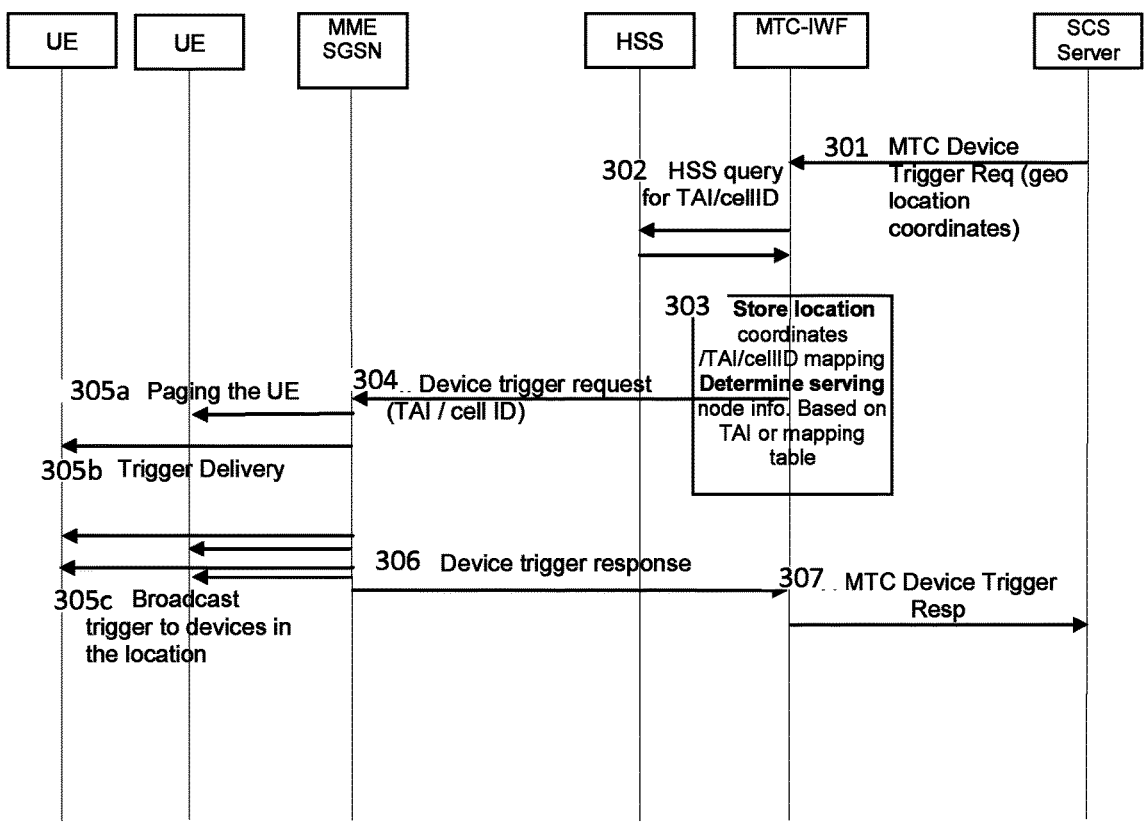
FIG. 3 illustrates a signal flow according to certain embodiments of location based triggering.

According to a first option, illustrated in FIG. 3, the devices in a certain location can be triggered using TA/cell ID, for example, the devices can be triggered based on their current location. In universal mobile telecommunication system (UMTS)/GPRS, an alternative to TA is the routing area (RA).

According to a second option, illustrated in FIG. 3, location based grouping can be performed and a device can be triggered using the group identifier, for example the devices can be triggered based on an original subscribed location or updated subscribed location.

Different approaches can be used to address different use cases. In scenarios in which the operators are simply trying to trigger a certain class of devices located in a certain location, for example all smart meters in New York City, the first option may be selected. In scenarios in which the operators are grouping the devices based on their original subscribed location and are trying to reach the devices to perform a software update irrespective of the location they are currently in, for example notification to all public safety personnel from New York City, the second option may be selected.

FIG. 3 illustrates a signal flow according to certain embodiments of location based triggering. Thus, FIG. 3 illustrates a procedure by one or more user equipment can be triggered in a certain location.

In this approach, a server can provide the geographic (geo) location coordinates and the coordinates can be mapped to the corresponding tracking area identifier (TAI) and/or cell identifier (ID). Devices residing in the corresponding TAI/cell ID can be triggered.

As shown in FIG. 3, at 301, the application server or the services capability server (SCS) can have access to the geo location coordinates for the area where the devices should be triggered and can provide these to a machine type communication interworking function (MTC-IWF or IWF). Then, the IWF can map the geo location coordinates to the corresponding TAI/cell ID. This can be done either with the help of a mapping table within IWF or a mapping table within a home subscriber server (HSS). Alternatively the IWF can, at 302, query a server that translates geo location to TAI/cell ID.

At 303, the IWF can store the coordinates, the TAI, and/or the cell ID and can identify a serving node that serves the corresponding TAI/cell ID. This can also be done with the help of a mapping table within IWF or a mapping table within the HSS. Alternatively, TAI, which includes a tracking area code (TAC), can be coded in a way that it identifies directly the MME/serving general packet radio service (GPRS) support node (SGSN) fully qualified domain name (FQDN).

Then, at 304, the IWF can send a trigger request to the MME/SGSN for the corresponding TAI/cell ID. The MME/SGSN can determine the number of UE(s) and the number of cells (since the tracking area could span more than one cell) that need to be triggered in the given location. Depending on this MME/SGSN can determine whether it should, at 305c, send a broadcast request to eNB to include the trigger in the system broadcast information or send trigger content using broadcast/multicast channel, broadly including multicast and/or broadcast, or trigger the devices individually using unicast channel either sequentially or in parallel. When triggering the devices individually, MME/SGSN can, at 305a, page the device if it is in idle mode and deliver, at 305b, the trigger request to the UE. Thus, in general, the MME/SGSN can either use broadcast or multicast mechanisms or page the devices individually, in parallel or sequentially.

Upon completion of trigger delivery, a device trigger response can be sent at 306 to the IWF. Then, at 307, the IWF can forward the device trigger response to the SCS.

Figure 4:
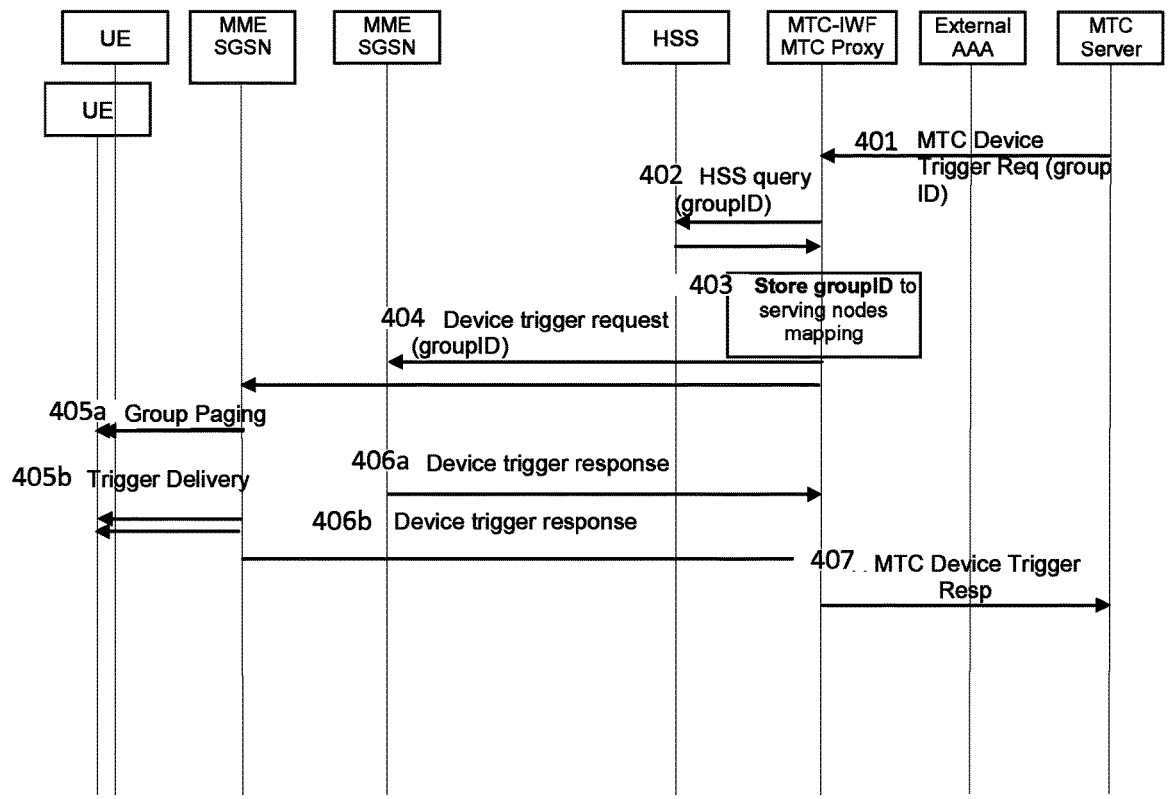
FIG. 4 illustrates a signal flow according to certain embodiments of group identifier based triggering.

FIG. 4 illustrates a signal flow according to certain embodiments of group identifier based triggering. Thus, FIG. 4 illustrates performance of location based grouping and device triggering using a group identifier. The operator can perform location based grouping and can trigger the devices using group identifier. If the assignment of the group was done at the time of subscription and the grouping remains static but the devices are mobile, then the trigger request may span multiple, otherwise unrelated TAI/cell IDs. Thus, multiple serving nodes may be involved in performing the trigger, even if only a single group identifier is used.

Accordingly, in FIG. 4 the UEs may be grouped based on location, such as an initial or updated location, and triggered using one or more group. As shown in FIG. 4, at 401, the application server or the SCS can have access to the Group ID and can provide the group ID, when the users are to be triggered. The IWF maps the group ID to the corresponding serving node information. This can be done either with the help of a mapping table within IWF or a mapping table within an HSS, for example, by performing an HSS query. Alternatively the IWF can, at 402, query a server, such as the HSS, that performs the mapping.

If the users in the group have moved across cells or MME/SGSN(s), then the number of serving nodes involved in triggering the devices could be more than one. Thus, at 403, the IWF may store the serving node addresses for the given group.

Then, at 404, the IWF can send a trigger request to the involved MME/SGSN(s) for the corresponding group ID(s). At 405a, the MME/SGSN can perform group paging for the devices in a group and, at 405b, deliver the trigger to the UEs. The same procedure can be performed by all the involved serving nodes.

Upon completion of trigger delivery, at 406a and 405b device trigger response(s) can be sent to the IWF from each of the serving nodes. Then, at 407, upon receiving completion of trigger delivery from all the serving nodes, the IWF can forward the device trigger response to the SCS.

Certain embodiments can applied not only to MTC devices but also to public safety devices, as well as to public safety devices that are also MTC devices. For example, certain embodiments can be applied to a group of all members of a volunteer fire fighting company, of a National Guard unit, or other organization. Certain embodiments also permit identification of serving nodes based on TAI/Cell ID. TAI could be coded in such a way that it identifies the serving node FQDN. Moreover, certain embodiments provide for triggering the devices based on their current location or triggering the devices based on their original location or an updated location. Furthermore certain embodiments may be applicable to GRPS, UMTS and long term evolution (LTE)/evolved packet core (EPC).

Figure 5:
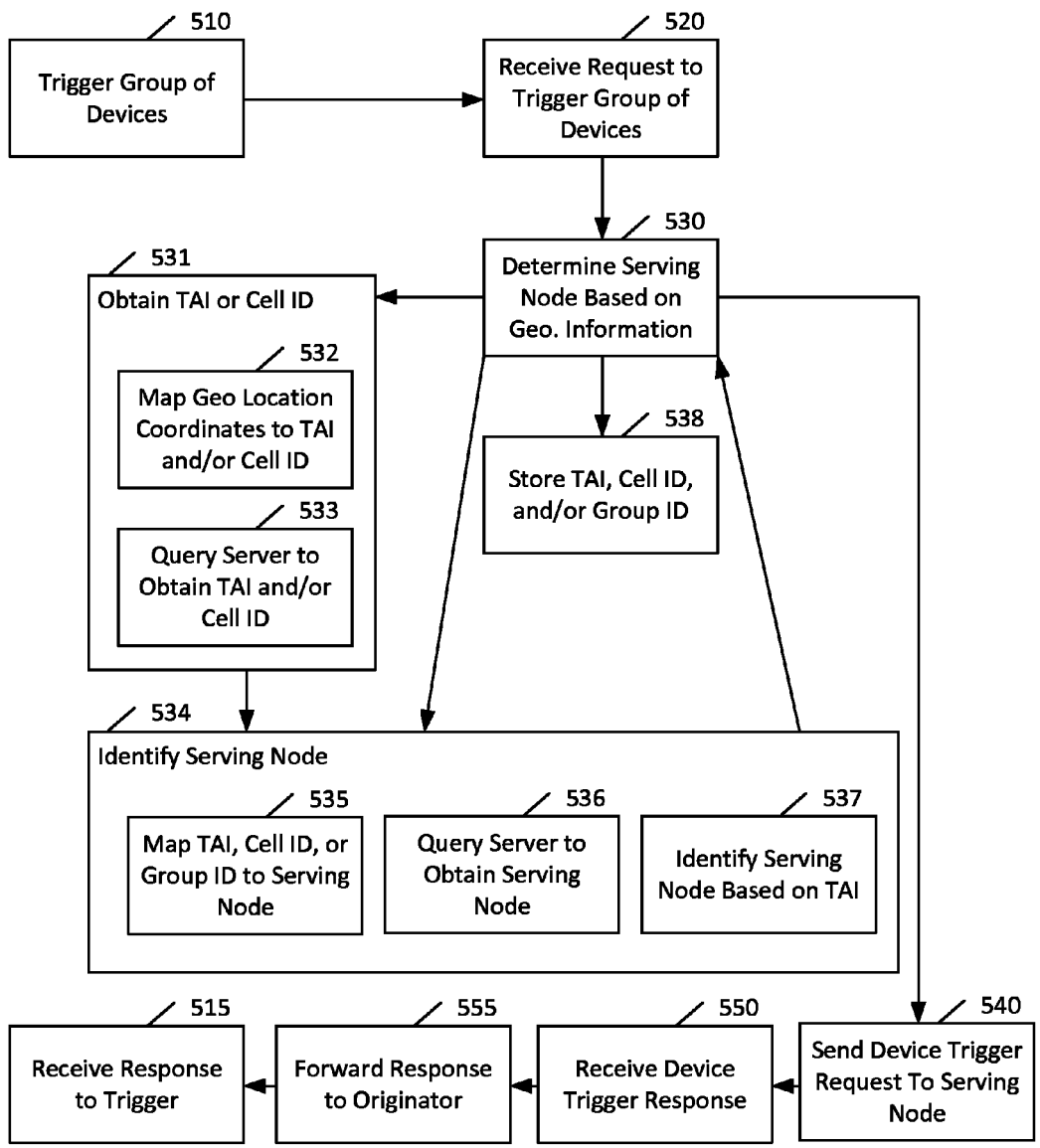
FIG. 5 illustrates a method according to certain embodiments.

FIG. 5 illustrates a method according to certain embodiments. The method of FIG. 5 may be performed by the devices illustrated in FIG. 6 and discussed below. As shown in FIG. 5, the method can include, at 510, triggering a group of devices using a triggering request. The method can also, at 515, include receiving a response to the triggering request. The triggering request can include at least one of geographic information or a group identifier based on geographic information. The geographic information can include at least one of geographic location coordinates, a tracking area identity, and a cell identifier. The triggering request can include a machine type communication device trigger request.

The method can also include, at 520, receiving the request to trigger a group of devices. The method can also include, at 530, determining at least one serving node based on the geographic information when the triggering request geographic information.

The method can include, at 531, obtaining a tracking area identifier or cell identifier. The method can include, at 532, mapping the geographic location coordinates to at least one of the tracking area identifier or the cell identifier based on a mapping table in a machine type communication interworking function. Alternatively, the method can include, at 533, querying a server to obtain the tracking area identifier or the cell identifier corresponding to at least one device of the group of devices.

The method can also include, at 534, identifying a serving node. For example, the method can include, at 535, mapping at least one of the tracking area identifier, the cell identifier, or the group identifier, to at least one serving node based on a mapping table in a machine type communication interworking function. Alternatively, the method can include, at 536, querying a server to identify a serving node corresponding to at least one of the tracking area identifier, the cell identifier, or the group identifier. As another alternative, the method can include, at 537, identifying serving node based on the tracking area identifier encoding.

Moreover, the method can include, at 538, storing at least one of the tracking area identifier, the cell identifier, the group identifier, or a server node address. The method can further include, at 540, sending a device trigger request including at least one of a tracking area identifier, a cell identifier, or the group identifier.

This device trigger can be received and delivered to at least one device of the group. Delivering the trigger can include determining whether broadcast request is sent to eNB (cell broadcast) to send trigger content using broadcast/multicast channel or to deliver the trigger individually using unicast channel prior to the delivering the trigger. More particularly, the method can include broadcasting or multicasting the trigger when more than a predetermined number of devices of the group are present in a particular geographic area and delivering the trigger individually when the number of devices of the group is less than or equal to the predetermined number. The predetermined number can be small, such as one, or can be larger, depend on the capacity of the coverage area in which the device trigger might be broadcasted. As shown in FIGS. 3 and 4, the method can also include paging the at least one device of the group before delivering the trigger to the at least one device.

The method can additionally include, at 550, receiving a device trigger response. Furthermore, the method can include, at 555, providing a corresponding device trigger response to a server that provided the request.

Figure 6:
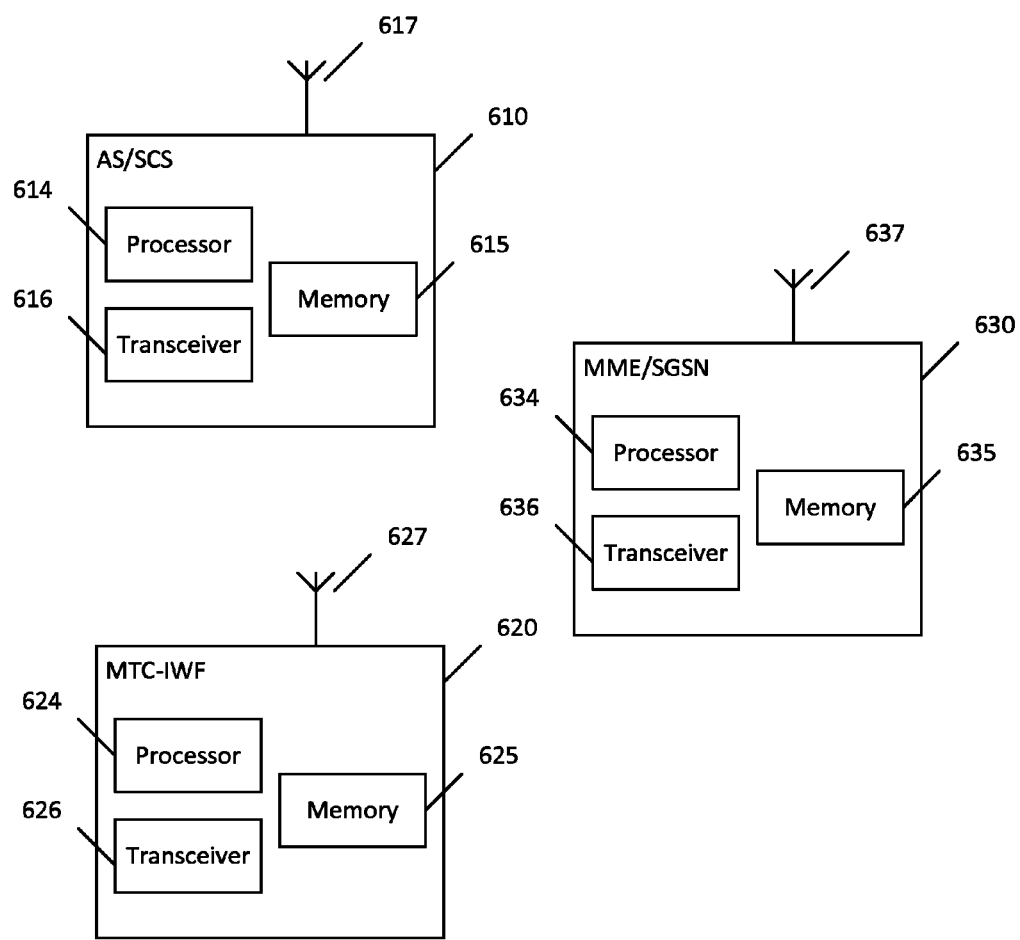
FIG. 6 illustrates a system according to certain embodiments.

FIG. 6 illustrates a system according to certain embodiments of the invention. In one embodiment, a system may include two devices, such as, for example, application server/services capability server (AS/SCS) 610, MTC-IWF 620, and MME/SGSN 630. Each of these devices may include at least one processor, respectively indicated as 614, 624, and 634. At least one memory is provided in each device, and indicated as 615, 625, and 635, respectively. The memory may include computer program instructions or computer code contained therein. Transceivers 616, 626, and 636 are provided, and each device may also include an antenna, respectively illustrated as 617, 627, and 637. Other configurations of these devices, for example, may be provided. For example, AS/SCS 610, MTC-IWF 620, and MME/SGSN 630 may be configured for wired communication, rather than wireless communication, and in such a case antennas 617, 627, and 637 would illustrate any form of communication hardware, without requiring a conventional antenna.

Transceivers 616, 626, and 636 can each, independently, be a transmitter, a receiver, or both a transmitter and a receiver, or a unit or device that is configured both for transmission and reception.

Processors 614, 624, and 634 can be embodied by any computational or data processing device, such as a central processing unit (CPU), application specific integrated circuit (ASIC), or comparable device. The processors can be implemented as a single controller, or a plurality of controllers or processors.

Memories 615, 625, and 635 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate therefrom. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as AS/SCS 610, MTC-IWF 620, and MME/SGSN 630, to perform any of the processes described above (see, for example, FIGS. 3-5). Therefore, in certain embodiments, a non-transitory computer-readable medium can be encoded with computer instructions that, when executed in hardware, perform a process such as one of the processes described herein. Alternatively, certain embodiments of the invention can be performed entirely in hardware.

Furthermore, although FIG. 6 illustrates a system including an AS/SCS, MTC-IWF, and MME/SGSN, embodiments of the invention may be applicable to other configurations, and configurations involving additional elements, as illustrated herein.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
    an interworking function receiving a request to trigger a group of devices, wherein the request comprises geographic information indicating the geographic location of at least one device;
    the interworking function translating the geographic information into a corresponding area, the area being served by a plurality of access network nodes and a trigger being sent to the plurality of access network nodes involved in performing the trigger;
    the interworking function determining at least one serving node based on the geographic information; and
    the interworking function sending a device trigger request including at least one of a tracking area identifier or a cell identifier to the at least one serving node.

2. The method of claim 1, wherein the geographic information comprises at least one of geographic location coordinates, a tracking area identity, and a cell identifier.

3. The method of claim 1, further comprising:
    mapping the geographic location coordinates to at least one of the tracking area identifier or the cell identifier based on a mapping table in a machine type communication interworking function.

4. The method of claim 1, further comprising:
    querying a server to obtain the tracking area identifier or the cell identifier corresponding to at least one device of the group of devices.

5. The method of claim 1, further comprising:
    mapping at least one of the tracking area identifier, the cell identifier, or a group identifier, to at least one serving node based on a mapping table in a machine type communication interworking function.

6. The method of claim 1, further comprising:
    querying a server to identify a serving node corresponding to at least one of the tracking area identifier, the cell identifier, or a group identifier.

7. The method of claim 1, further comprising:
    identifying a serving node based on the tracking area identifier or tracking area identifier encoding.

8. The method of claim 1, further comprising:
    storing at least one of the tracking area identifier, the cell identifier, a group identifier, or a server node address.

9. The method of claim 1, further comprising:
    receiving a device trigger response; and
    providing a corresponding device trigger response to a server that provided the request.

10. An interworking function apparatus, comprising:
    at least on processor; and
    at least one memory including computer program code,
    wherein the at least one memory and the computer program code are configured to, with the at least one processor, cause the apparatus at least to
    receive a request to trigger a group of devices, wherein the request comprises geographic information indicating the geographic location of at least one device;
    translate the geographic information into a corresponding area, the area being served by a plurality of access network nodes and a trigger being sent to the plurality of access network nodes involved in performing the trigger;
    determine at least one serving node based on the geographic information; and
    send a device trigger request including at least one of a tracking area identifier or a cell identifier to the at least one serving node.

11. The apparatus of claim 10, wherein the geographic information comprises at least one of geographic location coordinates, a tracking area identity, and a cell identifier.

12. The apparatus of claim 10, wherein the at least one memory and the computer program code are configured to, with the at least one processor, cause the apparatus at least to map the geographic location coordinates to at least one of the tracking area identifier or the cell identifier based on a mapping table in a machine type communication interworking function.

13. The apparatus of claim 10, wherein the at least one memory and the computer program code are configured to, with the at least one processor, cause the apparatus at least to query a server to obtain the tracking area identifier or the cell identifier corresponding to at least one device of the group of devices.

14. The apparatus of claim 10, wherein the at least one memory and the computer program code are configured to, with the at least one processor, cause the apparatus at least to map at least one of the tracking area identifier, the cell identifier, or a group identifier, to at least one serving node based on a mapping table in a machine type communication interworking function.

15. The apparatus of claim 10, wherein the at least one memory and the computer program code are configured to, with the at least one processor, cause the apparatus at least to query a server to identify a serving node corresponding to at least one of the tracking area identifier, the cell identifier, or a group identifier.

16. The apparatus of claim 10, wherein the at least one memory and the computer program code are configured to, with the at least one processor, cause the apparatus at least to identify a serving node based on the tracking area identifier.

17. The apparatus of claim 10, wherein the at least one memory and the computer program code are configured to, with the at least one processor, cause the apparatus at least to store at least one of the tracking area identifier, the cell identifier, a group identifier, or a server node address.

18. The apparatus of claim 10, wherein the at least one memory and the computer program code are configured to, with the at least one processor, cause the apparatus at least to
   receive a device trigger response; and
   provide a corresponding device trigger response to a server that provided the request.

19. A non-transitory computer readable medium encoded with instructions that, when executed in hardware, perform a process, the process comprising:
   an interworking function receiving a request to trigger a group of devices, wherein the request comprises geographic information indicating the geographic location of at least one device;
   the interworking function translating the geographic information into a corresponding area, the area being served by a plurality of access network nodes and a trigger being sent to the plurality of access network nodes involved in performing the trigger;
   the interworking function determining at least one serving node based on the geographic information; and
   the interworking function sending a device trigger request including at least one of a tracking area identifier or a cell identifier to the at least one serving node.

20. The non-transitory computer readable medium of claim 19, wherein the geographic information comprises at least one of geographic location coordinates, a tracking area identity, and a cell identifier.

21. The non-transitory computer readable medium of claim 19, the process further comprising:
   mapping the geographic location coordinates to at least one of the tracking area identifier or the cell identifier based on a mapping table in a machine type communication interworking function.

22. The non-transitory computer readable medium of claim 19, the process further comprising:
   querying a server to obtain the tracking area identifier or the cell identifier corresponding to at least one device of the group of devices.

23. The non-transitory computer readable medium of claim 19, the process further comprising:
   mapping at least one of the tracking area identifier, the cell identifier, or a group identifier, to at least one serving node based on a mapping table in a machine type communication interworking function.

24. The non-transitory computer readable medium of claim 19, the process further comprising:
   querying a server to identify a serving node corresponding to at least one of the tracking area identifier, the cell identifier, or a group identifier.

25. The non-transitory computer readable medium of claim 19, further comprising:
   identifying a serving node based on the tracking area identifier.

26. The non-transitory computer readable medium of claim 19, the process further comprising:
   storing at least one of the tracking area identifier, the cell identifier, a group identifier, or a server node address.

27. The non-transitory computer readable medium of claim 19, further comprising:
   receiving a device trigger response; and
   providing a corresponding device trigger response to a server that provided the request.

* * * * *